(12) United States Patent
Jejcic

(10) Patent No.: US 7,354,192 B2
(45) Date of Patent: Apr. 8, 2008

(54) BLENDER WITH SAFETY GRILLE FOR PRODUCING ICE-CREAM AND SIMILAR

(75) Inventor: Valter Jejcic, Nova Gorica (SI)

(73) Assignee: Valmar Global VSE ZA Sladoled D.O.O., Volcja Draga (SI)

( * ) Notice: Subject to any disclaimer, the term of this patent is extended or adjusted under 35 U.S.C. 154(b) by 0 days.

(21) Appl. No.: 11/602,079

(22) Filed: Nov. 20, 2006

(65) Prior Publication Data

US 2007/0133343 A1 Jun. 14, 2007

(30) Foreign Application Priority Data

Nov. 18, 2005 (IT) .......................... TO2005A0815

(51) Int. Cl.
*B01F 15/00* (2006.01)
(52) U.S. Cl. ..................................... 366/347
(58) Field of Classification Search ................ 366/347, 366/183.1, 183.2, 189, 196, 309–313; 165/109.1; 62/342–344
See application file for complete search history.

(56) References Cited

U.S. PATENT DOCUMENTS 4,364,666 A 12/1982 Keyes
7,047,758 B2 * 5/2006 Ross

FOREIGN PATENT DOCUMENTS

| EP | 0726029 A2 | | 8/1996 |
|---|---|---|---|
| EP | 1380213 A1 | | 1/2004 |
| JP | 2-124063 | * | 5/1990 |
| JP | 200-142683 | * | 5/2002 |

OTHER PUBLICATIONS

European Search Report, E4454/06-EP, Mar. 19, 2007.

* cited by examiner

*Primary Examiner*—Charles E. Cooley
(74) *Attorney, Agent, or Firm*—Robert P. Lenart, Esq.; Pietragallo Gordon Alfano Bosick & Raspanti, LLP

(57) ABSTRACT

A blender, for producing ice-cream and similar, has a box-shaped outer casing; a substantially cylindrical tubular bowl having a horizontal axis and extending from the surface of, and inwards of, the box-shaped casing; and a cover fitted movably to the box-shaped casing so as to be positioned closing the inlet of the bowl, a hopper projecting from the body of the cover, a safety grille fixed removably to the body of the cover and designed to partly occupy the inlet of the hopper. The cover has a number of parallel, aligned, projecting pins projecting from the body of the cover. The safety grille has a supporting crosspiece extending astride the projecting pins and having a number of transverse dead holes engaged firmly, but easily removably, by respective aforementioned projecting pins; and a rigid grille structure projecting from the supporting crosspiece to engage the inlet of the hopper.

8 Claims, 2 Drawing Sheets

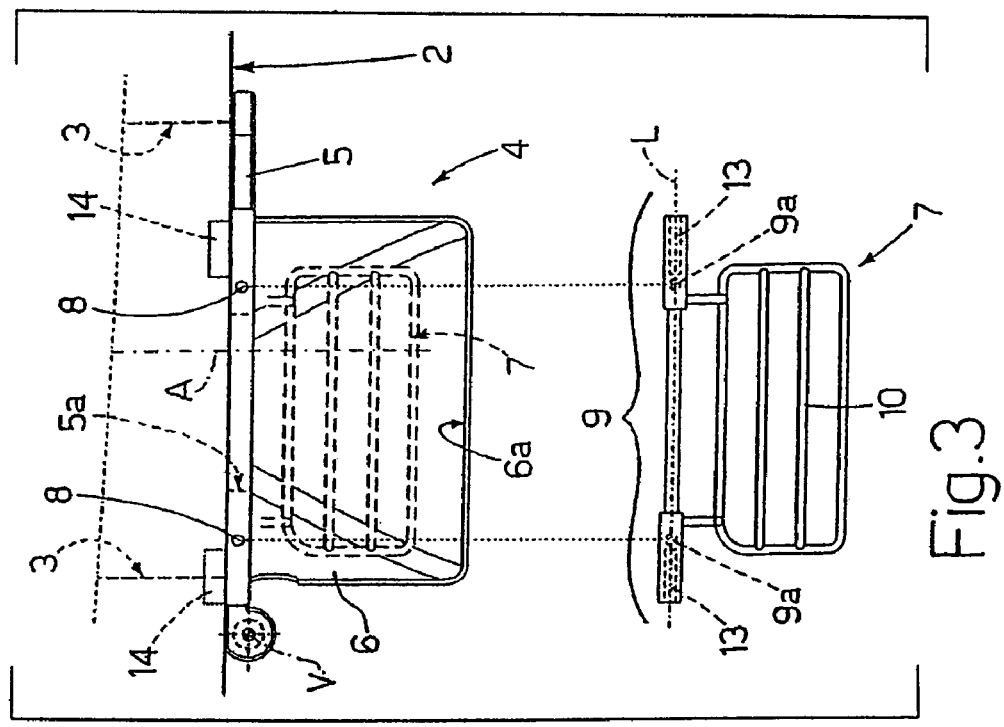
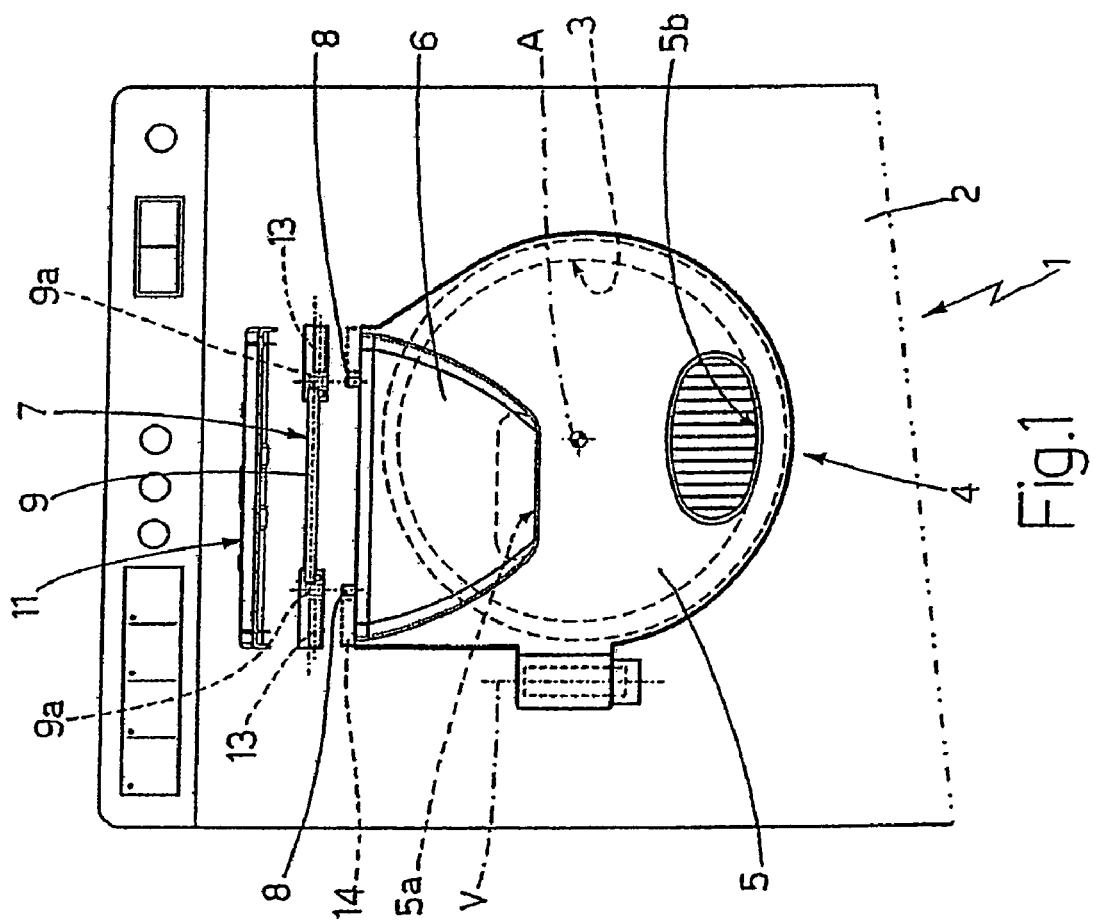

BLENDER WITH SAFETY GRILLE FOR PRODUCING ICE-CREAM AND SIMILAR

BACKGROUND OF THE INVENTION

As is known, blenders used for making home-made ice-cream normally comprise a cylindrical, horizontal-axis bowl into which the ingredients for producing a given quantity of ice-cream are poured; a hatch hinged to the outer casing of the blender to rotate about a vertical axis into a closed position closing the inlet of the bowl; an internal cooling unit for cooling and maintaining the bowl and contents at a temperature ranging between −10° C. and −35° C.; and a mixing member mounted for rotation inside the bowl to blend the ingredients at the various ice-cream-making stages.

The hatch in turn substantially comprises a porthole-like cover designed to close the bowl inlet in fluidtight manner, and hinged to the outer casing of the blender, alongside the bowl inlet, to rotate about a vertical axis to and from an operating position closing the bowl inlet. The body of the cover has a central through opening, through which the ice-cream ingredients can be fed into the bowl while the mixing member is rotating inside the bowl; and a peripheral through opening, located close to the bottom peripheral edge of the cover, through which to expel the ice-cream at the end of the blending process.

In addition, the bowl hatch also comprises an ingredient hopper projecting from the cover to feed the ice-cream ingredients through the central through opening; and a safety grille located at the ingredient hopper inlet. The safety grille is obviously fixed to the cover so that it can be removed easily for fast cleaning of the hopper at the end of each operating cycle.

The bowl hatch normally also has a sealing device designed to seal the peripheral through opening in the main body of the cover in fluidtight manner, and to only allow the ice-cream to be expelled at the end of the blending process.

For safety reasons, blenders of the type described above are also equipped with a number of sensors for detecting when the cover is positioned closing the bowl inlet, and when the safety grille is positioned at the ingredient hopper inlet, and for preventing rotation of the mixing member inside the bowl in the event either one of the above components is not in the safe operating position.

Unfortunately, the solutions adopted so far to prevent rotation of the mixing member inside the bowl, in the event the blender is not in the safe operating condition, have proved ineffective. Very often, in fact, the user manages to disable the sensors detecting the presence of the safety grille at the ingredient hopper inlet, and to operate the blender without the grille to pour the ingredients into the bowl faster.

SUMMARY OF THE INVENTION

It is an object of the present invention to provide a blender for producing ice-cream and similar, which is intrinsically safer than known types, and is also cheaper to produce.

According to the present invention, there is provided a blender for producing ice-cream and similar, as claimed in the attached claims.

BRIEF DESCRIPTION OF THE DRAWINGS

A non-limiting embodiment of the present invention will be described by way of example with reference to the accompanying drawings, in which:

FIG. 1 shows a partly exploded front view of a blender in accordance with the teachings of the present invention;

FIG. 3 shows a plan view of a detail of the FIGS. 1 and 2 blender.

DETAILED DESCRIPTION OF THE INVENTION

Figure 2:
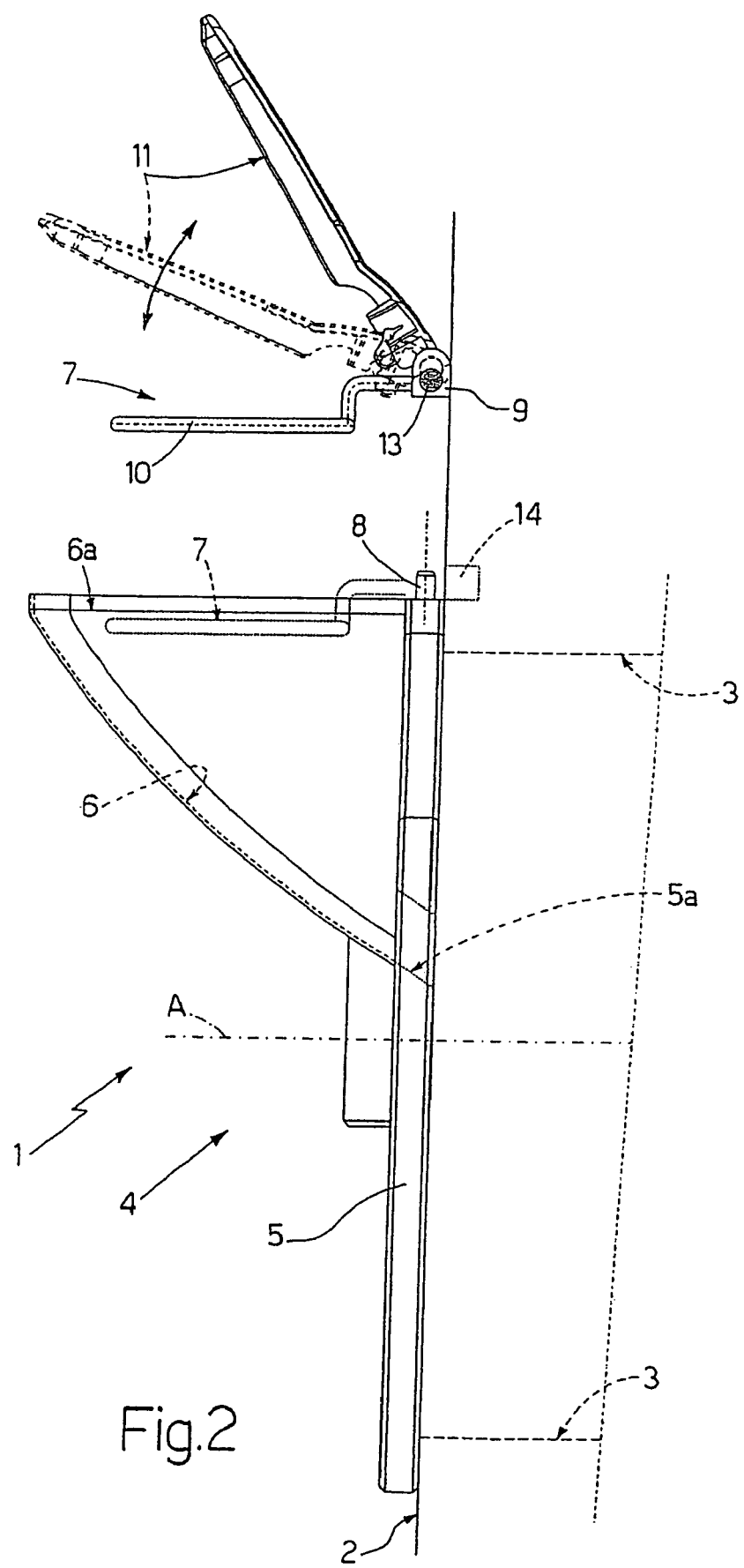
FIG. 2 shows a side view of the FIG. 1 blender, with parts in section and parts removed for clarity.

With reference to FIGS. 1, 2 and 3, number 1 indicates as a whole a blender for producing home-made ice-cream and similar, and which substantially comprises a box-shaped, preferably, though not necessarily, parallelepiped-shaped outer casing 2; and a substantially cylindrical tubular bowl 3 extending from the surface of, and inwards of, box-shaped casing 2, and coaxially with a preferably, though not necessarily, horizontal axis A, so that the inlet of bowl 3 is defined by a substantially circular opening formed in a portion of box-shaped casing 2. Bowl 3 is designed to receive the various ingredients for producing the desired amount of ice-cream.

Blender 1 also comprises a hatch 4 designed to close the inlet of bowl 3, and which is fitted movably to box-shaped casing 2 of the blender, so as to be positioned closing the inlet of bowl 3; an internal cooling unit (not shown) for cooling and maintaining bowl 3 and the contents at a temperature ranging between −10° C. and −35° C.; and a mixing member (not shown) mounted for rotation about axis A inside bowl 3 to blend the home-made ice-cream ingredients.

Bowl 3, the cooling unit, and the mixing member are commonly known within the industry and therefore not described further.

Hatch 4, on the other hand, comprises a substantially porthole-like cover 5, which is preferably, though not necessarily, made of stainless steel, is designed to close the inlet of bowl 3 in fluidtight manner, and is hinged to box-shaped casing 2 of the blender, alongside the inlet of bowl 3, to rotate, about a preferably, though not necessarily, vertical axis V, between a first operating position (FIG. 1), in which cover 5 seals the inlet of bowl 3, and a second operating position, in which cover 5 is positioned to the side of the inlet of bowl 3 to allow direct access to bowl 3. Cover 5 has a central through opening 5a formed close to the centre of cover 5, so as to be positioned close to the centre of the inlet of bowl 3, i.e. close to axis A, when cover 5 is positioned sealing the inlet of bowl 3; and a peripheral through opening 5b formed beneath central through opening 5a, close to the bottom peripheral edge of cover 5, so as to be positioned substantially tangent to the peripheral edge of the inlet of bowl 3 when cover 5 is positioned sealing the inlet of bowl 3.

Central through opening 5a allows the ice-cream ingredients to be poured into bowl 3 while the mixing member is rotating about axis A inside the bowl; while peripheral through opening 5b provides for expelling the ice-cream at the end of the blending process.

With reference to FIGS. 1, 2 and 3, hatch 4 also comprises a hopper 6 projecting from the body of cover 5 and communicating directly with central through opening 5a to feed the ice-cream ingredients through the central through opening; and a safety grille 7 fixed removably to the body of cover 5 and designed to partly occupy the inlet 6a of hopper 6 to prevent insertion of the user's hands inside inlet 6a.

More specifically, cover 5 has a number of parallel, aligned, projecting pins 8 projecting substantially vertically from the main body of cover 5, and safety grille 7 substantially comprises a supporting crosspiece 9 extending astride all the projecting pins 8 and having a number of transverse dead holes 9a engaged firmly, but easily removably, by respective projecting pins 8; and a rigid grille structure 10 projecting from supporting crosspiece 9 to occupy the space bounded by inlet 6a of hopper 6.

In the example shown, cover 5 has two parallel, facing, projecting pins 8 projecting vertically from a straight horizontal peripheral edge portion of cover 5 adjacent to inlet 6a of hopper 6, so as to be substantially parallel to and face the surface of box-shaped casing 2 surrounding the inlet of bowl 3.

Supporting crosspiece 9 is defined by a straight, square-section bar, which rests on said straight horizontal peripheral edge portion of cover 5, and has, at each of the two ends, a transverse dead hole 9a extending inside the body of straight bar 9, perpendicularly to the longitudinal axis L of the bar, and sized to receive a corresponding projecting pin 8 of cover 5.

With reference to FIGS. 1 and 3, hatch 4 preferably, though not necessarily, has a hand-operated sealing device (not shown) designed to seal peripheral through opening 5b in cover 5 in fluidtight manner, and to only allow the ice-cream to be expelled at the end of the blending process; and a plastic or metal auxiliary lid 11 sized to cover the whole of inlet 6a of hopper 6, and hinged to supporting crosspiece 9 to rotate, about an axis of rotation coincident with or at any rate parallel to longitudinal axis L of supporting crosspiece 9, to and from an operating position resting on and completely covering inlet 6a of hopper 6.

In the example shown, lid 11 is defined by a plastic plate, which is sized to cover the whole of inlet 6a of hopper 6, and has a lateral side designed to engage in freely rotating manner the rounded central segment of supporting crosspiece 9, so as to project from and rotate about longitudinal axis L to and from an operating position resting on and completely covering inlet 6a of hopper 6.

With reference to FIGS. 1, 2 and 3, blender 1 also comprises an electric control device for determining when cover 5 is positioned closing the inlet of bowl 3, and when safety grille 7 is positioned on the body of cover 5, partly covering inlet 6a of hopper 6, or, more specifically, when supporting crosspiece 9 of grille 7 is fitted to projecting pins 8 and rigid grille structure 10 occupies the space bounded by inlet 6a of hopper 6.

In other words, the electric control device determines when cover 5 is positioned closing the inlet of bowl 3, and when supporting crosspiece 9 is positioned resting on the straight horizontal peripheral edge portion of cover 5 adjacent to inlet 6a of hopper 6.

The electric control device of blender 1 is obviously connected to the electronic central control unit (not shown) of the blender to prevent rotation of the mixing member inside bowl 3 when cover 5 is not positioned closing the inlet of bowl 3, and when supporting crosspiece 9 is not positioned resting on the straight horizontal peripheral edge portion of cover 5 adjacent to inlet 6a of hopper 6, and substantially comprises at least one permanent magnet 13 and a corresponding magnetic presence sensor 14, which are located one on supporting crosspiece 9 of safety grille 7 of hatch 4, and the other on box-shaped casing 2 of the blender, and are only positioned facing each other when supporting crosspiece 9 is fitted to projecting pins 8 to hold rigid grille structure 10 over inlet 6a of hopper 6, and cover 5 is positioned closing the inlet of bowl 3.

More specifically, the electric control device of blender 1 comprises at least one permanent magnet 13 fixed stably to the body of supporting crosspiece 9, adjacent to or at one of the transverse dead holes 9a; and at least one magnetic presence sensor 14 located inside box-shaped casing 2 of the blender so as to be positioned facing permanent magnet 13 when supporting crosspiece 9 is fitted to projecting pins 8 and resting on said straight horizontal peripheral edge portion of cover 5, and cover 5 is positioned closing the inlet of bowl 3.

With reference to FIGS. 1 and 3, in the example shown, supporting crosspiece 9 of safety grille 7 is fitted with two permanent magnets 13 housed in the two ends of supporting crosspiece 9, each inside a respective longitudinal seat formed in the body of supporting crosspiece 9, adjacent to the transverse dead hole 9a for receiving projecting pin 8; and box-shaped casing 2 of the blender is fitted inside with two magnetic presence sensors 14 aligned horizontally directly over the inlet of bowl 3, so as to be aligned with the straight horizontal peripheral edge portion of cover 5 and with respective permanent magnets 13 when cover 5 is positioned closing the inlet of bowl 3 and supporting crosspiece 9 is fitted to projecting pins 8 and resting on the straight horizontal peripheral edge portion of cover 5.

Permanent magnets 13 and magnetic presence sensors 14 are commonly known in the industry and therefore not described further.

Operation of blender 1 will be clear from the foregoing description and accompanying drawings, with no further explanation required.

The advantages of blender 1 are obvious: given the design of hatch 4, only one permanent magnet 13 and one magnetic presence sensor 14 are required to determine when cover 5 is positioned closing the inlet of bowl 3, and grille 7 is fitted to cover 5 to cover inlet 6a of hopper 6, thus reducing manufacturing cost.

Moreover, locating permanent magnets 13 adjacent to or at the transverse dead holes 9a engaged by projecting pins 8 enhances the passive safety of the blender. In fact, in the absence of safety grille 7, the space in front of presence sensors 14 is at least partly occupied by projecting pins 8 of cover 5, and therefore cannot be occupied by fake permanent magnets to mislead the sensors.

Clearly, changes may be made to blender 1 as described and illustrated herein without, however, departing from the scope of the present invention.

The invention claimed is:

1. A blender for producing ice-cream and similar, the blender comprising a box-shaped outer casing; a substantially cylindrical tubular bowl extending from the surface of, and inwards of, the box-shaped casing and coaxially with a first reference axis; and a hatch designed to close the inlet of the bowl and fitted movably to said box-shaped casing so as to be positioned closing the inlet of said bowl; said hatch comprising a substantially porthole-like cover, which is designed to close the inlet of the bowl in fluidtight manner, is fitted to said box-shaped casing to move to and from an operating position closing the inlet of the bowl, and has a central through opening positioned close to the centre of the inlet of the bowl when the cover is positioned closing the inlet of the bowl; said hatch also comprising a hopper projecting from the body of the cover and connected to said central through opening, and a safety grille fixed removably to the body of said cover and designed to partly occupy the inlet of said hopper; wherein said cover comprises a number of parallel, aligned, projecting pins projecting from the body of the cover; and said safety grille comprises a supporting crosspiece extending astride said projecting pins and having a number of transverse dead holes engaged firmly, but easily removably, by respective said projecting pins, and a rigid grille structure projecting from said supporting crosspiece to engage the inlet of said hopper.

2. A blender as claimed in claim 1, wherein said cover is hinged to the box-shaped casing of the blender, alongside the inlet of the bowl, so as to rotate, about a second reference axis, between a first operating position, in which said cover closes the inlet of the bowl, and a second operating position, in which said cover is located to the side of said inlet of the bowl to permit direct access to said bowl.

3. A blender as claimed in claim 2, wherein said first reference axis is substantially horizontal, and said second reference axis is substantially vertical.

4. A blender as claimed in claim 3, wherein said projecting pins project substantially vertically from a straight horizontal portion of the peripheral edge of said cover, and said supporting crosspiece rests on said straight horizontal portion.

5. A blender as claimed in claim 1, wherein the projecting pins project from a portion of the peripheral edge of the cover, so as to be substantially parallel to and face the surface of the box-shaped casing surrounding the inlet of said bowl.

6. A blender as claimed in claim 1, further comprising an electric control device for determining when said cover is positioned closing the inlet of said bowl, and when said supporting crosspiece of the safety grille is fitted to said projecting pins, with the rigid grille structure engaging the inlet of said hopper.

7. A blender as claimed in claim 6, wherein said electric control device comprises at least one permanent magnet and a corresponding magnetic presence sensor, which are located one on the supporting crosspiece of said safety grille, and the other on said box-shaped casing of the blender, so as only to be positioned facing each other when the supporting crosspiece is fitted to the projecting pins, and the cover is positioned closing the inlet of the bowl.

8. A blender as claimed in claim 7, wherein said at least one permanent magnet is fixed stably to the body of said supporting crosspiece, adjacent to or at one of said transverse dead holes for receiving said projecting pins, and said at least one presence sensor is located inside said box-shaped casing so as to face said permanent magnet when the supporting crosspiece is fitted to the projecting pins, and the cover is positioned closing the inlet of said bowl.

* * * * *